US008862745B2

(12) United States Patent
Bair et al.

(10) Patent No.: US 8,862,745 B2
(45) Date of Patent: *Oct. 14, 2014

(54) AUTOMATIC NETWORK DOMAIN DIAGNOSTIC REPAIR AND MAPPING

(75) Inventors: Courtney S. Bair, Longmont, CO (US); Christopher T. Heublein, Evergreen, CO (US); Kimberly A. Jones, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 341 days.

This patent is subject to a terminal disclaimer.

(21) Appl. No.: 13/456,072

(22) Filed: Apr. 25, 2012

(65) Prior Publication Data

US 2012/0210004 A1 Aug. 16, 2012

Related U.S. Application Data

(63) Continuation of application No. 12/627,287, filed on Nov. 30, 2009, now Pat. No. 8,224,962.

(51) Int. Cl.
*G06F 15/173* (2006.01)
*G06F 21/00* (2013.01)
*H04L 9/32* (2006.01)
*H04L 29/12* (2006.01)
*H04L 12/26* (2006.01)
*H04L 12/24* (2006.01)

(52) U.S. Cl.
CPC ...... *H04L 29/12066* (2013.01); *H04L 61/1511* (2013.01); *H04L 43/0811* (2013.01); *H04L 41/14* (2013.01); *H04L 41/06* (2013.01)
USPC .......................................... 709/226

(58) Field of Classification Search
CPC ..................... H04L 29/12066; H04L 61/1511; H04L 43/0811; H04L 41/14; H04L 41/06
USPC .......................................... 709/226
See application file for complete search history.

(56) References Cited

U.S. PATENT DOCUMENTS 7,120,691 B2 * 10/2006 Goodman et al. ............ 709/225
7,392,435 B2    6/2008 Bezuindenhout
7,500,143 B2    3/2009 Buia et al.

(Continued)

OTHER PUBLICATIONS

Office Action issued on Feb. 18, 2011 for U.S. Appl. No. 12/627,287, 14 pages.

(Continued)

*Primary Examiner* — David X Yi
(74) *Attorney, Agent, or Firm* — Yee & Associates, P.C.; John R. Pivnichny

(57) ABSTRACT

An automatic network domain diagnostic, repair, and mapping tool facilitates access by a user to shared resources on a network. A user provides an address, such as a domain name system (DNS) address, of the shared resource and user identification information, such as a username and password. The provided address is checked and repaired if necessary to identify the network server having the shared resource. The identified server is checked, such as by pinging the server, to ensure that it is actually responding. The supplied user identification is checked, such as by querying a domain controller, to confirm whether the user identification corresponds to an existing account. When the checks are complete, and everything is found to be in order, the shared resource is mapped automatically for the user.

11 Claims, 4 Drawing Sheets

(56) References Cited

U.S. PATENT DOCUMENTS

| | | | |
|---|---|---|---|
| 7,865,537 B2 | 1/2011 | Kodama et al. | |
| 8,224,962 B2 | 7/2012 | Bair et al. | |
| 2002/0194319 A1* | 12/2002 | Ritche | 709/223 |
| 2004/0010584 A1 | 1/2004 | Peterson et al. | |
| 2004/0073596 A1* | 4/2004 | Kloninger et al. | 709/200 |
| 2008/0127310 A1 | 5/2008 | Robbins et al. | |
| 2009/0063406 A1* | 3/2009 | Golander et al. | 707/3 |
| 2009/0125522 A1* | 5/2009 | Kodama et al. | 707/9 |
| 2011/0131327 A1 | 6/2011 | Bair et al. | |

OTHER PUBLICATIONS

Response to Office Action filed on May 18, 2011 for U.S. Appl. No. 12/627,287, 15 pages.
Final Office Action issued on Aug. 3, 2011 for U.S. Appl. No. 12/627,287, 12 pages.
Appeal Brief filed Dec. 29, 2011 for U.S. Appl. No. 12/627,287, 32 pages.
Notice of Allowance issued on Mar. 7, 2012 for U.S. Appl. No. 12/627,287, 15 pages.

* cited by examiner

400

402 — Checking DNS Entries... OK
Current Values: div16.ibm.com, usaad.ibm.com, houston.ibm.com, ibm.com 404 — Checking DNS Suffixes...
Adapter: Intel® PRO/1000 MT Mobile Connection
DNS Domain: Div16.Ibm.Com 406 — Adapter: AGN Virtual Network Adapter
DNS Domain: Div16.Ibm.Com 408 — Ping Test – FFXWINPC02.div16.ibm.com: OK – 109 msec 410 — Querying Domain Controller For:
Domain\Username=DIV16.IBM.COM\csbair 412 — User Account: Found 414 — NOTE: Password Expires On: =4/22/2009

416 — SUCCESS: Mapped To Drive: F:

502 — Checking DNS Entries... OK
Current Values: div16.ibm.com, usaad.ibm.com, houston.ibm.com, ibm.com 504 — Checking DNS Suffixes...
Adapter: Intel® PRO/1000 MT Mobile Connection
DNS Domain: Div16.Ibm.Com 506 — Adapter: AGN Virtual Network Adapter
DNS Domain: Div16.Ibm.Com 508 — Ping Test – FFXWINPC02.div16.ibm.com: OK – 102 msec 510 — Querying Domain Controller For:
Domain\Username=USAAD.IBM.COM\TESTDISABLED 512 — User Account: Found 514 — Account Disabled 516 — Please Contact the Help Desk at 1-800-985-5406, Option 1
(8am-6pm Mon-Fri EST)

518 — Or Submit An Online Ticket: Ticket Webpage

*FIG. 5*

AUTOMATIC NETWORK DOMAIN DIAGNOSTIC REPAIR AND MAPPING

CROSS-REFERENCE TO RELATED APPLICATION

This application is a continuation of application Ser. No. 12/627,287, filed Nov. 30, 2009, now U.S. Pat. No. 8,224,962 issued Jul. 17, 2012.

BACKGROUND

1. Field

The disclosure relates generally to computer networks, and more particularly to systems and methods for accessing shared resources on such networks by users.

2. Description of the Related Art

In general, a computer network includes a plurality of computers that may communicate with each other via one or more network connections. The network connections may include a variety of wired and/or wireless connections. For example, the Internet provides for communications between computers to form a network. In addition to computers, other devices that may interact with computers may be included on the network. The computers on a network, and thus programs that may be run on the network computers, along with the other devices on the network, represent network resources. A user who has access to a computer on the network may be able to access and make use of any network resources for which the user has the appropriate permissions. To access a network resource, a user typically must identify the location of the resource and provide user identification information for access verification. For example, a resource may be identified by the user by providing a network address, such as a domain name system (DNS) address. User identification information that may be provided by a user to access a resource may include a username and password.

A more specific example of a computer network is a Windows Server domain. A Windows Server domain is a logical group of computers running versions of the Microsoft Windows operating system that share a central directory database. This central database contains user accounts and security information for the resources in the domain. Each person who uses computers within a domain receives his or her own unique account, or user name. This account can then be assigned access to resources within the domain. In a domain, the directory resides on computers that are configured as domain controllers. A domain controller is a server that manages all security-related aspects of user and domain interactions, thereby centralizing security and administration. The domain is not limited to a single location or specific type of network configuration. Computers in the domain can share physical proximity on a small local area network (LAN), or they can be located in different parts of the world, as long as they can communicate.

SUMMARY

An automatic network domain diagnostic, repair, and mapping tool is disclosed. In accordance with an illustrative embodiment, an address of a shared resource on a computer on a computer network and user identification information is received from a user. The address provided by the user is checked, and repaired if necessary, to identify the network computer hosting the shared resource. The identified computer is checked to determine whether it is responding. The user identification information is checked to determine whether it corresponds to an existing open account. When the computer hosting the resource is determined to be responding, and the user identification information corresponds to an existing account, the shared resource is mapped automatically for use by the user.

Illustrative embodiments may be implemented as a method implemented in a computer network. Illustrative embodiments may be implemented as a computer program product, including a computer readable storage medium, having stored thereon computer program instructions for controlling a data processing system to perform functions in accordance with an illustrative embodiment. Illustrative embodiments may be implemented as an apparatus comprising a processor unit and a memory coupled to the processor unit and having stored therein instructions that are readable by the processor unit for controlling the processor unit to perform functions in accordance with an illustrative embodiment.

BRIEF DESCRIPTION OF THE SEVERAL VIEWS OF THE DRAWINGS

FIG. 4 is an example of a report generated in accordance with an illustrative embodiment.

FIG. 5 is another example of a report generated in accordance with an illustrative embodiment.

DETAILED DESCRIPTION

An automatic network domain diagnostic, repair, and mapping tool is disclosed. A tool in accordance with an illustrative embodiment may be employed in any computer domain or network setting or application in which shared resources on the network are available to users. For example, a tool in accordance with an illustrative embodiment may be employed or implemented for use in a Windows Server domain, or a similar computer domain, but illustrative embodiments are not limited to this particular application.

The different illustrative embodiments recognize and take into account a number of different considerations. For example, the different illustrative embodiments recognize and take into account that many users have reported that accessing resources on a domain share network often is such a difficult task that they avoid anything hosted on a domain. This is due to the extreme limitations of existing domain interfaces. Such interfaces do not provide feedback to the user when attempting to access domain resources. Any number of problems could exist that would prevent the user from accessing a shared resource. Yet, current interfaces respond to a failure to access a resource by simply asking a user to enter their password repeatedly, until the account is locked after repeated failed attempts. This has led to an untold amount of user frustration.

A tool in accordance with an illustrative embodiment addresses many of the limitations of current systems by automatically detecting and repairing common network resource access issues, reporting status and other pertinent information to the user in a quick and easy to read fashion, and automatically mapping the shared resource to the user behind the scenes, without requiring any technical knowledge or skill on the part of the user.

Figure 1:
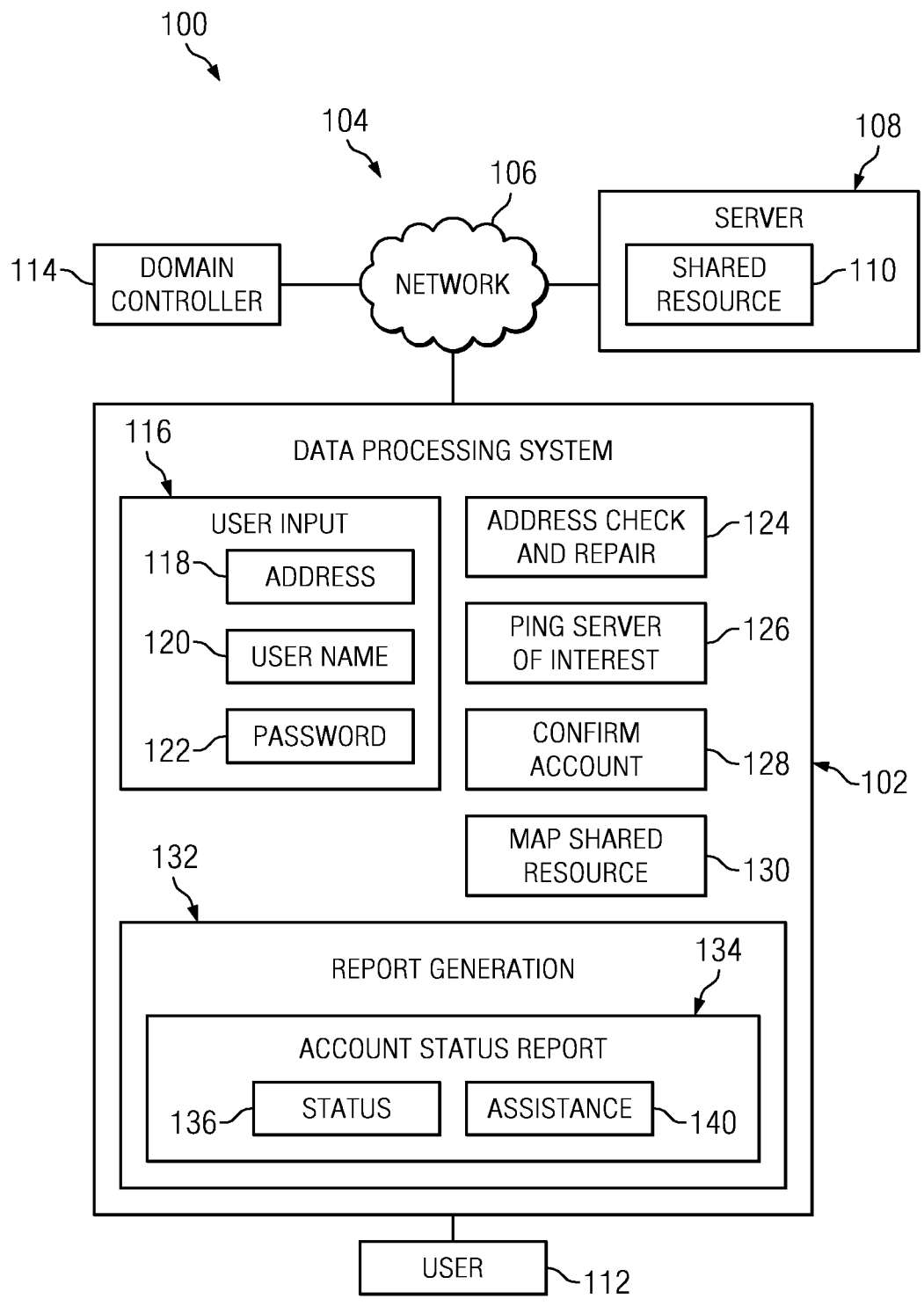
FIG. 1 is a block diagram illustrating functional components of a system in accordance with an illustrative embodiment.

Functional components of automatic network domain diagnostic repair and mapping tool 100 in accordance with an illustrative embodiment are illustrated in FIG. 1. Tool 100 may be implemented in data processing system 102 that is part of computer network 104. As will be discussed in more detail below, data processing system 102 may include a computer or other data processing system or device or a plurality of such computers or devices operating together to perform the functions in accordance with an illustrative embodiment disclosed herein. Computer network 104 may include any number of computers and other devices and systems connected together via network connection 106. Network connection 106 may include wired and/or wireless network connections, such as local area network and/or wide area network connections, as well as multiple network connections of the same or different types. Network connection 106 also may provide connections between and among computer networks. Thus, computer network 104 may include a network of computer networks. For example, computer network 104 may include a group of computers implementing a Windows Server domain.

Computer network 104 may include any number of computers, including one or more servers 108. In accordance with an illustrative embodiment, server 108, or one or more other computers on network 104, may contain or host shared resource 110. Remote user 112 may desire to access shared resource 110 via network connection 106.

One or more computers on network 104 may implement domain controller function 114. Domain controller 114 responds to security authentication requests, such as logging in, checking permissions, and the like, within a domain implemented on network 104 that includes shared resource 110.

In accordance with an illustrative embodiment, user 112 desiring to access shared resource 110 provides user input information 116. User input information 116 may include network address 118, identifying a location of shared resource 110 on network 104, and user identification information, including username 120 and password 122. For example, user provided network address 118 may include a domain name system (DNS) address.

In accordance with an illustrative embodiment, address check and repair function 124 checks address 118 provided by user 112, and repairs it if necessary, to identify server 108 or other computer hosting desired shared resource 110. Ping server of interest function 126 pings the identified server 108 to check whether or not it is responding. Confirm account function 128 checks to confirm whether user identification information, such as username 120 and/or password 122, corresponds to an existing open account. Confirm account function 128 may include querying domain controller 114. If server 108 is found to be responding and the user account is confirmed, map shared resource function 130 automatically maps shared resource 110 for use by user 112.

In accordance with an illustrative embodiment, whether or not server 108 is found to be responding, or the user account is confirmed, report generation function 132 may generate and display to user 112 account status report 134. Account status report 134 may include status information 136, which may include user friendly information regarding the user's connection to shared resource 110, including, when user 112 is not able to access shared resource 110, an explanation of why user 112 could not access shared resource 110. When user 112 is not able to access shared resource 110, account status report 134 also may include assistance information 140, such as the telephone number of or link to a help desk or problem reporting or ticketing system.

The illustration of FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, although various functions in accordance with an illustrative embodiment are shown in FIG. 1 within the block for a single data processing system 102, such functions may be implemented on one or more data processing systems located anywhere on computer network 104.

Figure 2:
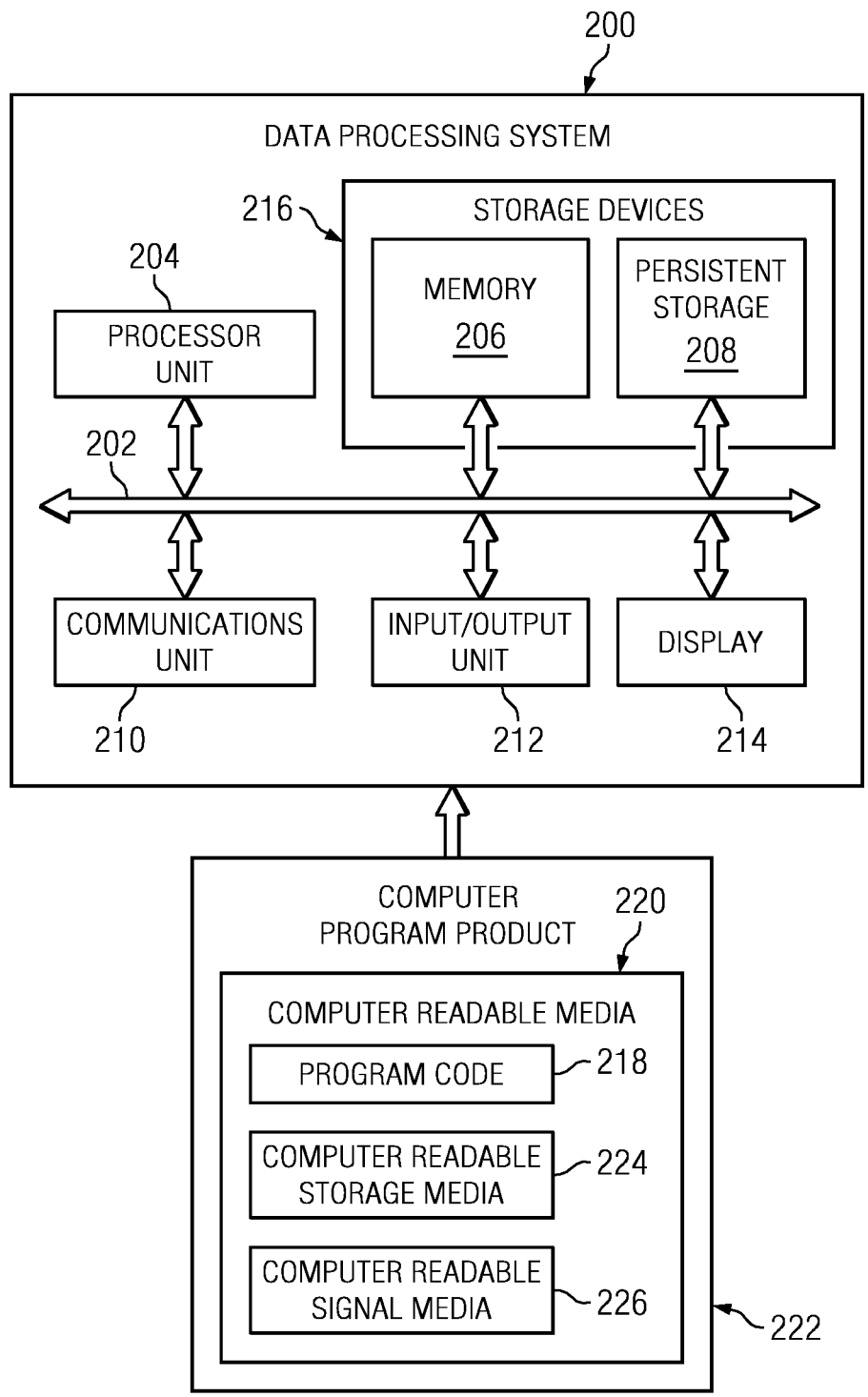
FIG. 2 is a block diagram of a data processing system depicted in accordance with an illustrative embodiment.

Turning now to FIG. 2, a diagram of a data processing system 200 is depicted in accordance with an illustrative embodiment. In this example, data processing system 200 is an example of one implementation of data processing system 102 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer.

Display 214 provides a mechanism to display information to a user. For example, a report generated in accordance with an illustrative embodiment may be displayed to a user on display 214.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 in order to be run by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 to be run by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
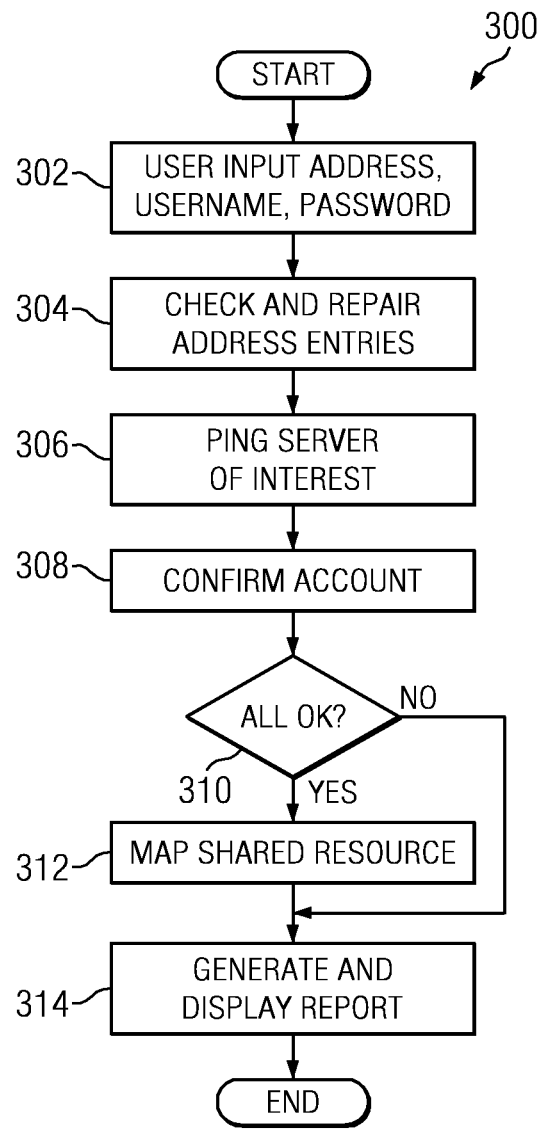
FIG. 3 is a flowchart of a method in accordance with an illustrative embodiment.

Method 300 in accordance with an illustrative embodiment is illustrated in FIG. 3. In accordance with an illustrative embodiment, method 300 begins with a user inputting information identifying the location of a shared resource and user identification information (step 302). For example, the location of the shared resource may be identified by a network address, such as a domain name system (DNS) address. The user identification information may include a username and/or password.

The user inputted address entry is checked, and repaired if necessary (step 304). For example, step 304 may include checking and repairing domain name system address entries, and suffixes, which may have been reset by one application or another, thereby preventing connection to the remote shared resource unless repaired.

The server or other computer hosting the shared resource then is checked to ensure that it is actually responding (step 306). Step 306 may include pinging the server of interest in a known manner.

The user identification information provided by the user is checked to determine whether a user account exists (step 308). Step 308 may include querying a domain controller to confirm the supplied username currently exists in an account. Users sometimes have various names on different servers, which is confusing and can lead to a locked account.

It is determined whether the checks performed in steps 306 and 308 indicate that everything is in order (step 310). If everything is in order, the shared resource is mapped automatically for use by the user (step 312).

Without regard to the result of step 310, a report is generated and displayed for the user (step 314). Step 314 includes generating and providing to a user an account status report providing information to the user on the results of previous steps 304 through 312. Step 314 may include generating a report all at once, after previous steps 304 through 312 have been completed. Alternatively, and preferably, step 314 may include dynamically generating and displaying portions of the report as each step 304 through 312 is implemented and completed, thereby providing the user with real-time information on the progress of the automatic network domain diagnostic repair and mapping tool's attempt to access a shared resource. This reporting feature is very useful. By immediately informing the user of problems making a connection to a shared resource, the user will know if the problem is caused by user error or if there is a problem with the account.

An example status report 400 generated in accordance with an illustrative embodiment is shown in FIG. 4. Report 400 may be presented to a user, for example, on a computer display. Report 400 includes lines of text 402, 404, and 406 that report to the user the status of address checks and any repairs that were performed in accordance with an illustrative embodiment. Report 400 includes lines of text 408 reporting to the user the result of a ping test performed in accordance with an illustrative embodiment. Report 400 includes lines of text 410 reporting to the user the result of checking to confirm the user account in accordance with an illustrative embodiment. In this case, report 400 includes text 412 indicating that the user account was found and text 416 reporting successful automatic mapping of the shared resource for the user.

Report 400 may include the user's password expiration date 414, which may be obtained when querying the domain controller. This is a user friendly feature. If a user has accounts on many domains they will not receive notification of pending password expiration unless they log into that domain.

Another example status report 500 generated in accordance with an illustrative embodiment is shown in FIG. 5. Report 500 includes lines of text 502, 504, and 506 that report to the user the status of address checks and any repairs that were performed in accordance with an illustrative embodiment. Report 500 includes lines of text 508 reporting to the user the result of a ping test performed in accordance with an illustrative embodiment. Report 500 includes lines of text 510 reporting to the user the result of checking to confirm the user account in accordance with an illustrative embodiment. In this case, report 500 includes text 512 indicating that the user account was found and text 514 reporting that the user account was found to be disabled.

Since the user account could not be accessed, report 500 also includes user assistance information. For example, report 500 includes a phone number 516 for a help desk and link 518 to an online ticketing system, so the user can request assistance immediately. Report 500 provides a description of the problem encountered in attempting to access a shared resource. The text within report 500 can be cut and copied in a conventional manner into an email message to the help desk, or pasted into an online ticket. The information in report 500 will be very helpful to the help desk technicians, since it shows that many potential common problems in connecting to a shared resource have already been checked and fixed.

The format and content of a report in accordance with an illustrative embodiment is not limited to the format and content shown by example in reports 400 and 500. For example, information that may be provided to a user in a report in accordance with an illustrative embodiment, when a shared resource cannot be accessed by a user, may include the following: An indication that the account is locked, that the account referenced by the user is currently locked and may not be logged on to. An indication that the account is disabled. An indication that the user password has expired. All of these indications are indications of problems with the account itself. Other information that may be provided to a user in a report in accordance with an illustrative embodiment, when a shared resource cannot be accessed by a user, may include the following: An indication that the user provided account information is unknown, that the user referenced account does not exist. An indication that the user provided password is incorrect, that the password is unknown or bad, resulting in a logon failure. These last two indications are indications of a potential user mistake that may be corrected by the user entering the correct information. Other helpful information in various other formats may be included in a report in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and explanation, but is not intended to be exhaustive or to limit the invention to the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for managing access to shared resources, the method comprising:

one or more processors receiving user input from a user for accessing a shared resource, the user input including a user identification of the user and an address of the shared resource on a data processing system on a computer network; and responsive to receiving the user input, the one or more processors generating and presenting to the user, on a computer display, real-time information updates about the progress of each of a plurality of steps taken in the computer network to provide access to the shared resource wherein the plurality of steps include a first step for checking and repairing the address of the shared resource to identify the data processing system, a second step for checking the data processing system to determine whether the data processing system is responding, a third step for checking whether the user identification corresponds to an existing open account by querying a network domain controller to confirm whether the user identification corresponds to the existing open account, and a fourth step for automatically mapping the shared resource for use by the user when the data processing system is determined to be responding and the user identification of the user is determined to correspond to the existing open account.

2. The method of claim 1, wherein the address of the shared resource in the user input received from the user includes a domain name system (DNS) address and wherein checking the address includes checking and repairing the domain name system address and any suffixes.

3. The method of claim 1, wherein checking the data processing system includes pinging a server containing the shared resource.

4. The method of claim 1, wherein the user identification includes a password and further comprising including in the report an expiration date of the password.

5. A computer program product including a non-transitory computer readable storage medium having stored thereon computer program instructions for managing access to shared resources, the computer program product comprising:

computer program instructions stored on the non-transitory computer readable storage medium to receive user input from a user for accessing a shared resource, the user input including a user identification of the user and an address of the shared resource on a data processing system on a computer network;

computer program instructions stored on the non-transitory computer readable storage medium, responsive to receiving the user input, to generate and present to the user, on a computer display, real-time information updates about the progress of each of a plurality of steps taken in the computer network to provide access to the shared resource wherein the plurality of steps include a first step for checking and repairing the address of the shared resource to identify the data processing system, a second step for checking the data processing system to determine whether the data processing system is responding, a third step for checking whether the user identification corresponds to an existing open account by querying a network domain controller to confirm whether the user identification corresponds to the existing open account, and a fourth step for automatically mapping the shared resource for use by the user when the data processing system is determined to be responding and the user identification of the user is determined to correspond to the existing open account.

6. The computer program product of claim 5, wherein the address of the shared resource in the user input received from the user includes a domain name system (DNS) address and wherein the computer program instructions to check the address includes computer program instructions stored on the non-transitory computer readable storage medium to check and repair the domain name system address and any suffixes.

7. The computer program product of claim 5, wherein the computer program instructions to check the data processing system includes computer program instructions stored on the non-transitory computer readable storage medium to ping a server containing the shared resource.

8. The computer program product of claim 5, wherein the user identification includes a password and further comprising computer program instructions stored on the non-transitory computer readable storage medium to include in the report an expiration date of the password.

9. An apparatus for managing access to shared resources, the apparatus comprising:
   one or more processor units connected to a computer network; and
   a memory coupled to the one or more processor units and having stored therein instructions that are readable by the one or more processor units for controlling the one or more processor units to:
   receive user input from a user for accessing a shared resource, the user input including a user identification of the user and an address of the shared resource on a data processing system on the computer network; and
   generate and present to the user, on a computer display, real-time information updates about the progress of each of a plurality of steps taken in the computer network to provide access to the shared resource in response to receiving the user input, wherein the plurality of steps include a first step for checking and repairing the address of the shared resource to identify the data processing system, a second step for checking the data processing system to determine whether the data processing system is responding, a third step for checking whether the user identification corresponds to an existing open account by querying a network domain controller to confirm whether the user identification corresponds to the existing open account, and a fourth step for automatically mapping the shared resource for use by the user when the data processing system is determined to be responding and the user identification of the user is determined to correspond to the existing open account.

10. The apparatus of claim 9, wherein the address of the shared resource in the user input received from the user includes a domain name system (DNS) address and wherein the instructions for controlling the one or more processor units to check the address includes instructions for controlling the one or more processor units to check and repair the domain name system address and any suffixes.

11. The apparatus of claim 9, wherein the instructions for controlling the one or more processor units to check the data processing system includes instructions for controlling the one or more processor units to ping a server containing the shared resource.

* * * * *